(12) United States Patent
Tomelleri

(10) Patent No.: US 7,552,543 B2
(45) Date of Patent: Jun. 30, 2009

(54) PROBE FOR GAUGING MACHINES

(75) Inventor: Raffaele Tomelleri, Villafranca (IT)

(73) Assignee: 3D Scanners Ltd., Derby (GB)

( * ) Notice: Subject to any disclaimer, the term of this patent is extended or adjusted under 35 U.S.C. 154(b) by 0 days.

(21) Appl. No.: 12/218,872

(22) Filed: Jul. 18, 2008

(65) Prior Publication Data
US 2009/0031575 A1    Feb. 5, 2009

Related U.S. Application Data

(63) Continuation of application No. PCT/IT2007/000064, filed on Jan. 31, 2007.

(30) Foreign Application Priority Data

Feb. 2, 2006  (IT) ............... VR2006A0024
Apr. 4, 2006  (IT) ............... VR2006A0061

(51) Int. Cl.
*G01B 5/012* (2006.01)
(52) U.S. Cl. .......................... 33/561; 33/503
(58) Field of Classification Search .......... 33/503, 33/501.08, 559, 561
See application file for complete search history.

(56) References Cited

U.S. PATENT DOCUMENTS

| | | | |
|---|---|---|---|
| 4,462,162 A | | 7/1984 | McMurtry |
| 4,734,994 A | * | 4/1988 | Cusack ............ 33/561 |
| 5,509,211 A | | 4/1996 | Ernst |
| 6,131,299 A | * | 10/2000 | Raab et al. ............ 33/503 |
| 6,151,789 A | * | 11/2000 | Raab et al. ............ 33/503 |
| 6,449,861 B1 | * | 9/2002 | Danielli et al. ............ 33/559 |
| 6,526,672 B1 | * | 3/2003 | Danielli et al. ............ 33/561 |
| 2005/0166413 A1 | * | 8/2005 | Crampton ............ 33/503 |

FOREIGN PATENT DOCUMENTS

WO    WO 95/22739    8/1995

OTHER PUBLICATIONS

The International Search Report for PCT Application No. PCT/IT2007/000064, Aug. 9, 2007.
The International Preliminary Report on Patentability, Aug. 14, 2008.

* cited by examiner

*Primary Examiner*—G. Bradley Bennett
(74) *Attorney, Agent, or Firm*—Amster, Rothstein & Ebenstein LLP

(57) ABSTRACT

A probe for gauging machines with articulated arms comprises a fixed gauging stylus (31), supporting, at its end, a gauging ball, characterized in that it also comprises a handle body (33) which can be manually operated by an operator to push the gauging ball against a surface to be gauged (13), and in that the handle body (33) is equipped with sensors sensitive to the force acting between the gauging ball and the surface to be gauged and in that the signal supplied by the sensors controls measurement acquisition.

25 Claims, 5 Drawing Sheets

PROBE FOR GAUGING MACHINES

This is a Continuation of PCT Application No. PCT/IT2007/000064, filed Jan. 31, 2007, which claims priority of Italian Application Nos. VR2006A000024, filed Feb. 2, 2006 and VR2006A000061, filed Apr. 4, 2006.

The present invention relates to a gauging probe for use in particular in gauging machines with articulated arms, which allows the acquisition of the measurement when the gauging ball is in contact with the surface to be gauged, guaranteeing that the load applied is within a predetermined range of values and without having to manually operate any push-button.

In gauging machines with articulated arms two types of probes are mostly used, fixed probes and electronic probes.

In fixed probes the gauging stylus is integral with the gauging machine, meaning that the position of the centre of the gauging surface (usually consisting of a gauging ball), which is fixed to the end of the gauging stylus, is completely defined by the angular measurement supplied by the synchros with which the machine is equipped.

With fixed probes the gauging ball is manually brought into contact with the surface to be gauged and the operator acquires the point by operating a push-button.

These probes are very simple and economical and allow the acquisition of a continual sequence of points while the gauging ball is in contact with the surface to be gauged, but they require operation of a push-button. Moreover, the load which acts on the part during gauging is not controlled.

In contrast, in electronic probes, when the gauging ball is placed in contact with the surface to be gauged with a load greater than a predetermined value, the stylus bends and breaks an electric circuit, supplying the measurement detection signal. These probes therefore limit the load to a controlled value but are quite expensive and only allow the acquisition of one point at a time.

In the description reference is made without distinction to load and force, and to force sensors and load sensors, the two terms having the same meaning.

There are also probes whose stylus is equipped with load sensors which enable gauging when the load acting on the gauging ball is within a predetermined range and which therefore allow the automatic acquisition of a sequence of points. These probes are quite expensive, since the load sensors are usually applied directly to the gauging stylus or to the base of the gauging stylus, which must be rigid enough not to compromise gauging precision, meaning that the sensors must be very sensitive.

This invention has for an aim to propose a gauging probe which allows the automatic acquisition of a sequence of points in a continuous fashion.

This invention also has for an aim to propose a gauging probe which avoids direct contact between the hand and the gauging stylus so as to avoid heating up the stylus and the consequent gauging errors caused by the thermal deformation induced.

This invention has for yet another aim to propose a probe for gauging machines with articulated arms, which is positioned and angled directly by the operator's hand and which allows automatic acquisition of the measurement when the force applied on a probe handle body is within a predetermined range of values.

An embodiment of the invention also has for an aim to propose a probe which allows automatic acquisition of the measurement while the operator sees directly in the probe the condition which enables gauging and is therefore able to control it.

A further aim, not the last, is to avoid applying load sensors directly on the gauging stylus or on the base of the gauging stylus, thus avoiding the possibility of the elastic deformations required by the sensor influencing gauging precision, and avoiding the use of very expensive sensors.

Accordingly, the present invention achieves these aims and others indicated in the description below with a probe made in accordance with the claims herein.

In general, it comprises a handle body which can be operated by the operator to move and angle a gauging stylus and to bring the gauging ball into contact with the surface to be gauged.

In a first embodiment the handle body is floating relative to the gauging stylus, whilst in another embodiment it is equipped with load sensors applied to the handle body.

It should be noticed that hereinafter the term "handle body" refers to the element gripped or in general operated by the operator to determine the direction of the probe during gauging. The handle body may consist of a rigid or elastic body, or of an assembly made up of two or more bodies, whether rigid or elastic. Moreover, the handle body may be rigidly fixed to the base of the gauging stylus or elastically fixed to it. Moreover, the handle body may be preloaded with forces so that when said forces are overcome it moves relative to the home position. In the latter case, the handle body is floating, and if the predetermined limits are exceeded, the load acting on it can deform it. If the handle body consists of two or more parts, if the predetermined limits are exceeded, the load acting on it can move the component parts relative to one another.

The term "floating" attributed to the handle body relative to the gauging stylus hereinafter refers to the fact that the handle body is not rigidly constrained to the gauging stylus, but instead, if the predetermined loads are exceeded, it is free to move at least according to one degree of freedom and with a predetermined extent relative to the gauging stylus. Said freedom of movement may be the result of a combination of two or more movements such as translation and rotation.

When the movement of the floating handle body is within a predetermined range of values, gauging is enabled. Said movement may be applied directly by the operator's fingers to directly enable gauging, or, if the operator does not touch the gauging stylus, the deformation is obtained by pushing the gauging ball against the surface to be gauged.

Moreover, the phrase "equipped with load sensors" attributed to the handle body relative to the gauging stylus hereinafter refers to the fact that one or more load sensors are applied to the handle body and supply a signal which depends on the load acting between the handle body and the gauging stylus.

The term "gauging stylus" hereinafter refers to the structure, usually having the shape of a cylindrical rod with various diameters, which supports the gauging ball at its end.

Consequently, "base of the gauging stylus" means the structure rigidly connected to the gauging stylus and which supports it, inserted between the gauging stylus and the gauging machine.

"Fixed gauging stylus" refers to the fact that the stylus is integral with the base of the gauging stylus and also integral with the gauging machine, so that the position of the centre of the gauging ball, which is fixed to the end of the gauging stylus, is completely defined by the angular measurement supplied by the synchros with which the machine is equipped and does not depend on the movement of the floating handle body from its home position.

The term "gauging surface" refers to the surface present at the end of the stylus and integral with it, for which, when placed in contact with the part to be gauged, the position and angle are acquired.

The term "gauging ball" refers to a special "gauging surface" having a spherical shape, which is brought into contact with the "surface to be gauged". Since most probes have spherical gauging surfaces, the invention will be described almost always with reference to a "gauging ball", although it shall be understood that every relative consideration is valid even when the gauging surface has a different shape. For example, the gauging surface may have the shape of a cylindrical surface or even of two cylindrical surfaces, as indicated below.

Finally, the term "load sensors" refers to transducers used to supply values relative to the force acting between the gauging ball and the surface to be gauged. These sensors are of the most diverse types, since they may consist of strain gauges (deformable resistors connected bridge style), piezoelectric sensors, Hall effect sensors, etc., used individually or in numbers consisting of two or more so that the electronics connected to them can supply one or more signals linked to the amplitude, and if necessary also the direction, with an acceptable error, of the load acting between the handle body and the gauging stylus. When the signal supplied by the load sensors is within a predetermined range of values, gauging is enabled. Said load acting between the handle body and the gauging stylus may be applied directly by the operator's fingers to directly enable gauging, or, if the operator does not touch the gauging stylus, the load depends on the force acting between the gauging ball and the surface to be gauged. For the sake of convenience, the accompanying drawings illustrate one, two or three load sensors, although it shall be understood that there may be a different number of them.

Therefore, in accordance with the present invention, the gauging stylus is of the fixed type, that is to say, the position of the centre of the gauging ball integral with it is completely defined by the angular position supplied by the gauging machine axes transducers, and does not depend on the position or angle of the handle body relative to the gauging stylus.

If the handle body is floating, it is preloaded with forces which act between the handle body and the base of the gauging stylus in such a way as to hold it in its home position when it is gripped. Only when the external forces which act on the handle body exceed predetermined values does it move from said home position (overcoming the preloading forces).

In practice, the operator acts manually on the floating handle body to move it laterally or axially, relative to the gauging stylus, when the gauging ball is in contact with the surface to be gauged.

During gauging, the operator can visually verify, by observing the position of the handle body relative to the gauging stylus, when the extent of the lateral and axial movement of the handle body relative to the gauging stylus are within the range of movements which enable gauging.

Finally, one or more sensors supply the gauging enabled signal when the lateral or axis movement of the floating body relative to the gauging stylus is within a predetermined interval.

The fact that the operator visually verifies in the probe when the extent of the lateral or axial deflection is within the predetermined interval which enables gauging means that the extent of the deflection is clearly evident, just as it appears evident if it is within the range of values which enable gauging. This allows him to easily control the gauging movements against the surface so as to keep gauging enabled, and, that is to say, without taking his eyes off the probe.

Other embodiments of the invention in which the handle body is equipped with load sensors also achieve the aim of the invention to allow automatic acquisition of the measurement when the force acting between the gauging ball and the surface to be gauged is within a predetermined range of values. Indirect gauging of the force using the load sensors applied to the handle body, even if affected by possible acceptable gauging errors, offers the advantage of avoiding application of the sensors directly on the gauging stylus, preventing deflections of the latter.

The present invention is described in more detail with reference to the accompanying drawings which illustrate several preferred, non-limiting embodiments, and in which.

Figure 1:
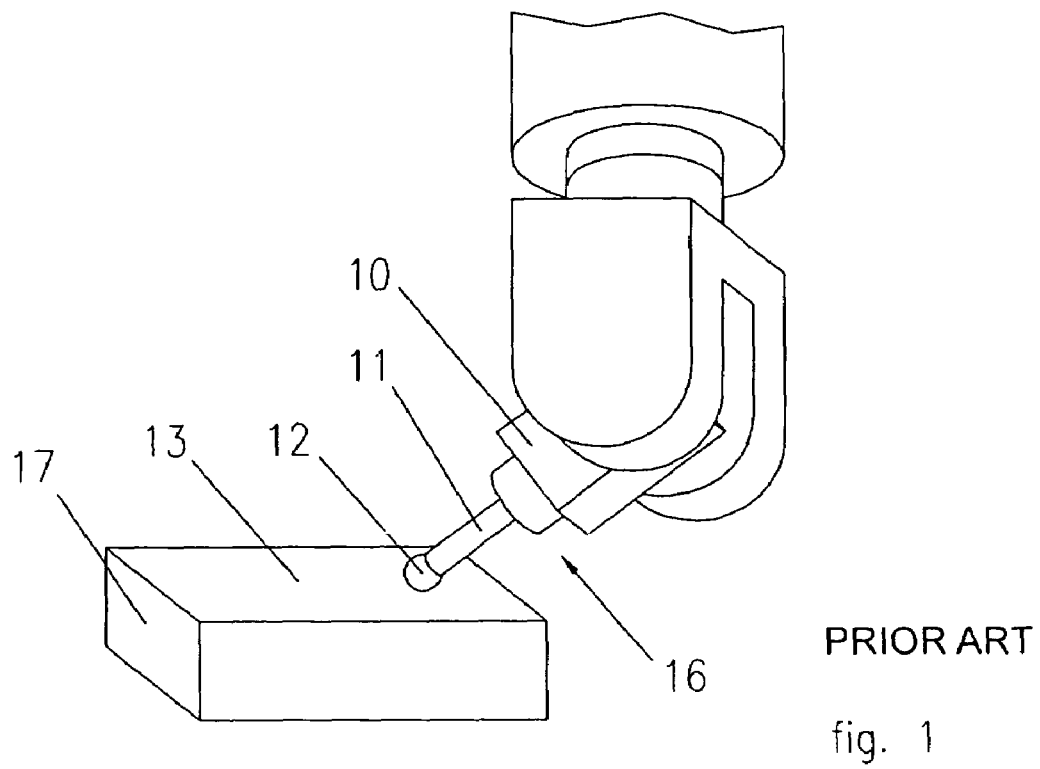
FIG. 1 is a schematic axonometric view of a fixed probe during gauging, made in accordance with the prior art.

FIG. 1 shows a common fixed probe applied to a machine with articulated arms. The probe 16 is fixed to the end part 10 of the gauging machine and is equipped with a stylus 11 whose end supports the ball 12 which is brought into contact with the surface to be gauged 13 belonging to the part 17.

Figure 2:
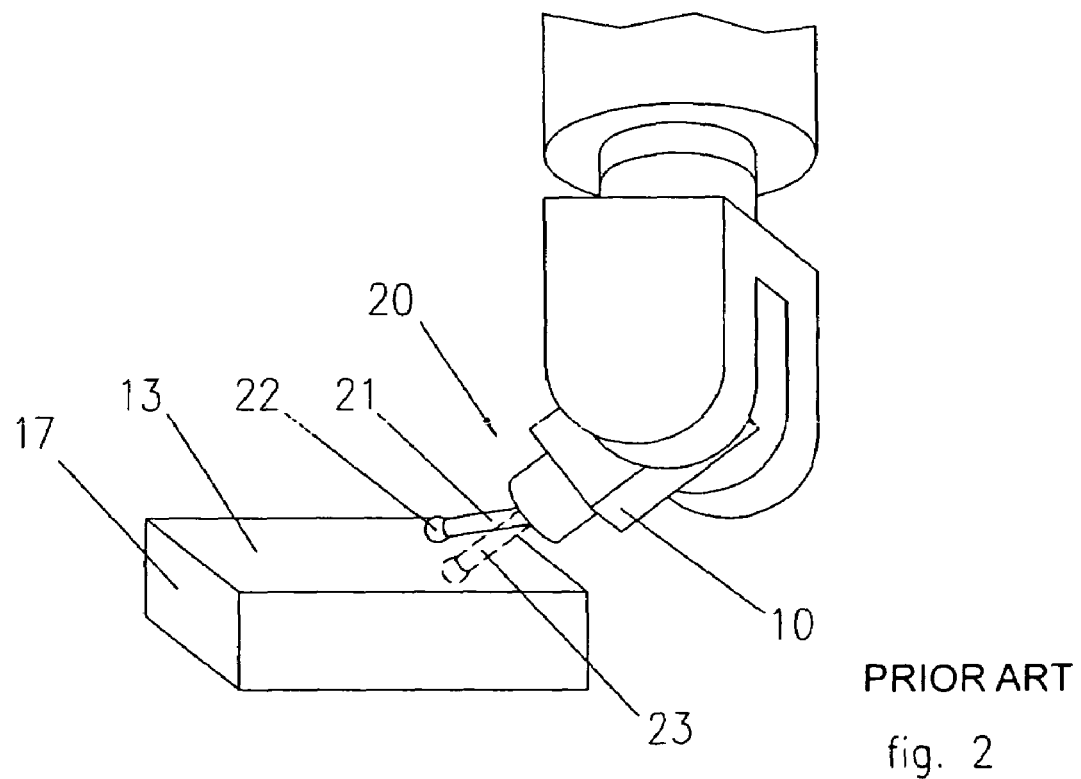
FIG. 2 is a schematic axonometric view of an electronic probe during gauging, made in accordance with the prior art.

FIG. 2 shows a known electronic probe 20 fixed to the end part of the machine 10. The probe is equipped with a stylus 21 whose end is integral with the gauging ball 22 which is brought into contact with the surface to be gauged 13. Acquisition of the measurement is automatic and takes place at the moment when the stylus, whose axis in the home position is in the position 23, is deflected by a minimum extent, finally reaching the position 22. This type of probe allows acquisition of a single point at the moment the deflection starts.

Figure 3:
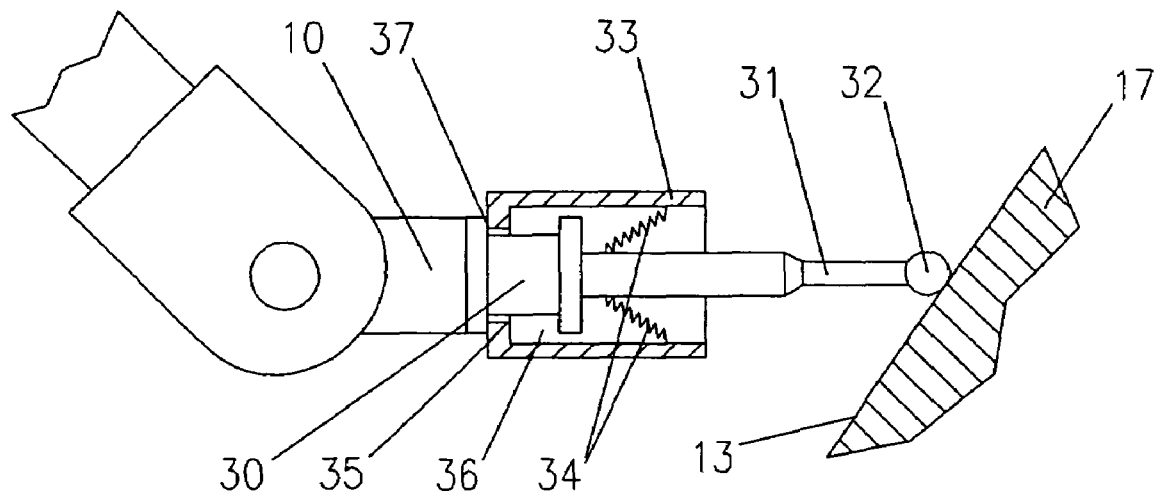
FIG. 3 is a schematic partial longitudinal section of a floating spring probe made in accordance with a first embodiment of the present invention.

FIG. 3 shows a first embodiment of the probe disclosed, fixed to the end body of the machine 10. It basically consists of the base of the stylus 30 integral with the stylus 31 (in turn integral at its end with the gauging ball 32), and of the handle body 33 which, in the home position, is, relative to the stylus 31, in the centred position illustrated in FIG. 3 thanks to the effect of three preloading springs 34. Said springs 34 apply a load whose resultant value is concentric with the handle body 33 therefore they cause the ring-shape projection 35 housed in the ring-shaped slot 36 to rest on the surface 37.

The handle body 33 may be gripped by the operator to angle and direct the probe towards the surface to be gauged 13. When the gauging ball is in contact with the surface to be gauged 13 and the force applied by the operator's hand on the handle body manages to overcome the preloading force applied by the springs, the handle body 33 is deflected relative to the stylus 31 and is detached from the surface 37. While the handle body is deflected, the gauging ball 32 remains in contact with the surface 13 whilst the position of the gauging ball 32 is completely transduced by the gauging machine transducers (of the known type and therefore not illustrated). Gauging continues to be enabled until the deflection exceeds a predetermined value.

Figure 4:
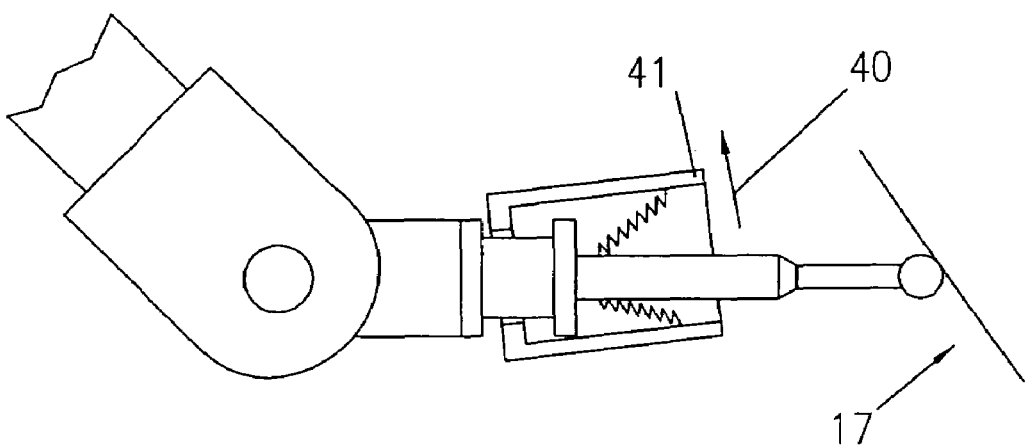
FIGS. 4 to 6 are schematic partial longitudinal sections of the floating probe of FIG. 3 during gauging.
Figure 5:
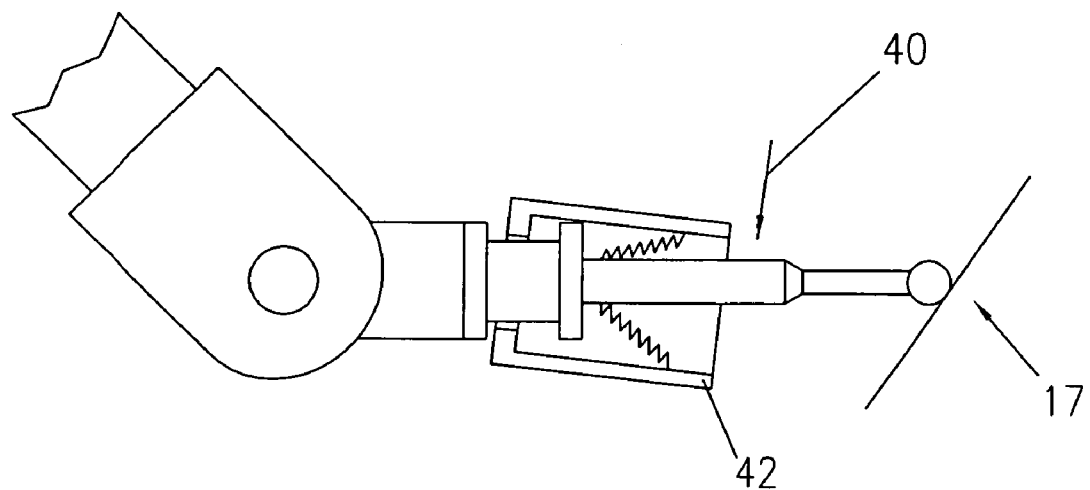
Figure 6:
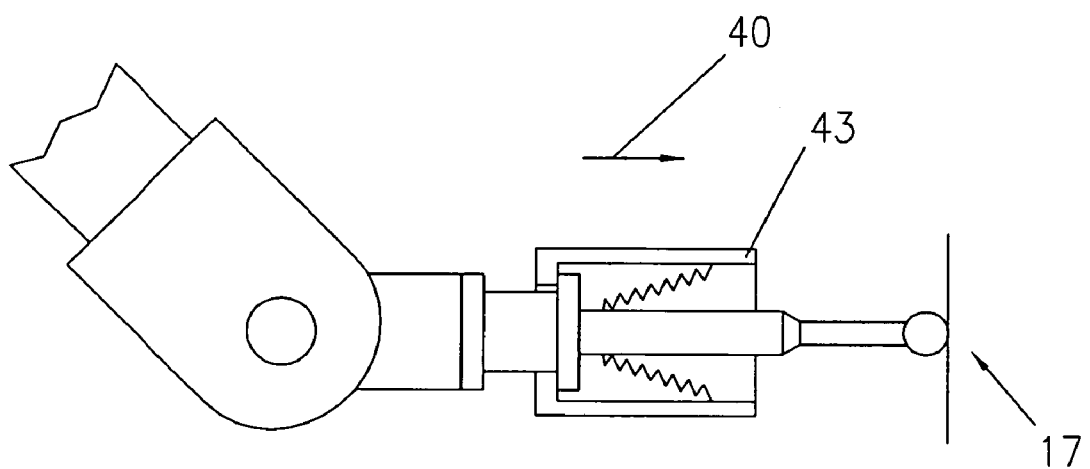

FIGS. 4, 5 and 6 show three different movements to which the handle body 33 may be subjected, which in the home condition is in the centred position shown in FIG. 3. In FIGS. 4, 5 and 6, the direction of movement of the stylus 31 is indicated by the arrow 40. When the gauging ball 32 is pushed laterally against the surface 13 (FIGS. 4 and 5), the handle body 33 moves into the position 41 indicated in FIG. 4 or into the position 42 indicated in FIG. 5 (in which it is deflected in the opposite direction). In contrast, when the handle body is pushed axially towards the surface to be gauged 13, it translates axially, moving to the position 42 indicated in FIG. 6. In practice all combinations of the two movements of deflection and translation may occur depending on the action applied by the operator's hand which reflects the load acting on the gauging ball.

Figure 7:
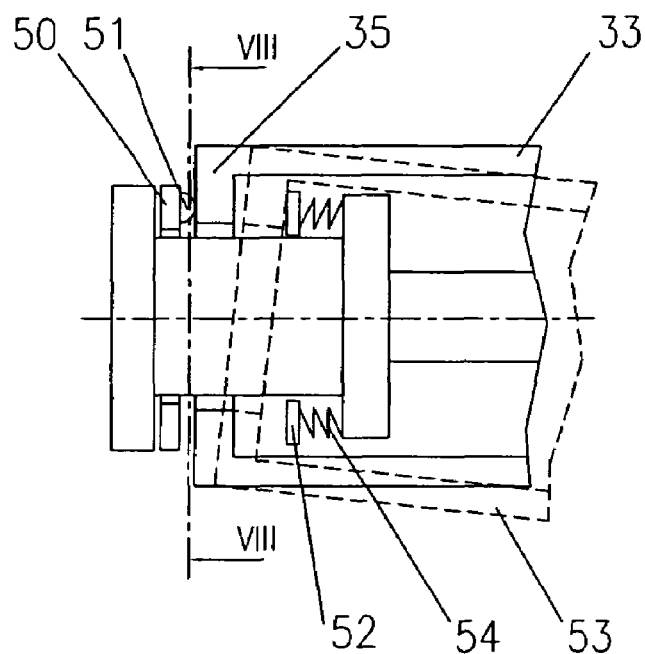
FIG. 7 is a schematic partial longitudinal section of the sensors which define the range of deflections which enable gauging.
Figure 8:
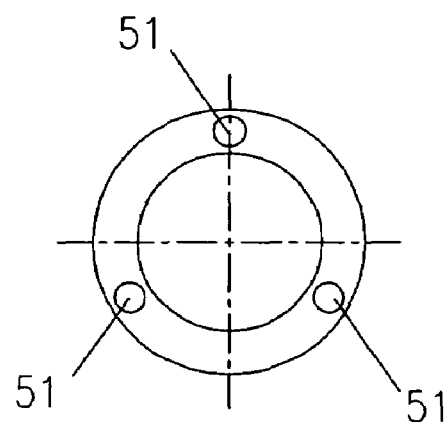
FIG. 8 is a schematic cross-section of the sensors which enable gauging of FIG. 7 according to the line VIII-VIII.

FIGS. 7 and 8 show the possible arrangement of the sensors which indicate when the handle body is deflected laterally or translated axially. The ring-shaped projection 35 is in contact with three contact points 51 which according to known techniques form three electrical contacts, therefore only when the handle body 33 is in the home position all three contact points 51 are in contact with the inner ring 35. If the handle body 33 is laterally diverted or axially translated at least one of the three points 51 is no longer in contact with the ring 35, and this enables gauging.

When the lateral deflection or the axial translation of the handle body 33 exceeds a predetermined value as indicated by the position 53 in FIG. 7, the ring 35 makes contact with the ring 52 which makes a circuit indicating that the maximum stroke has been reached. The ring 52 is supported by the spring 54 meaning that reaching the limit deflection (or translation) does not cause an impact against a rigid part which is instead elastically absorbed.

Suitable sensors may indicate said deformation for automatic acquisition of the measurements, with prior art methods.

Figure 9:
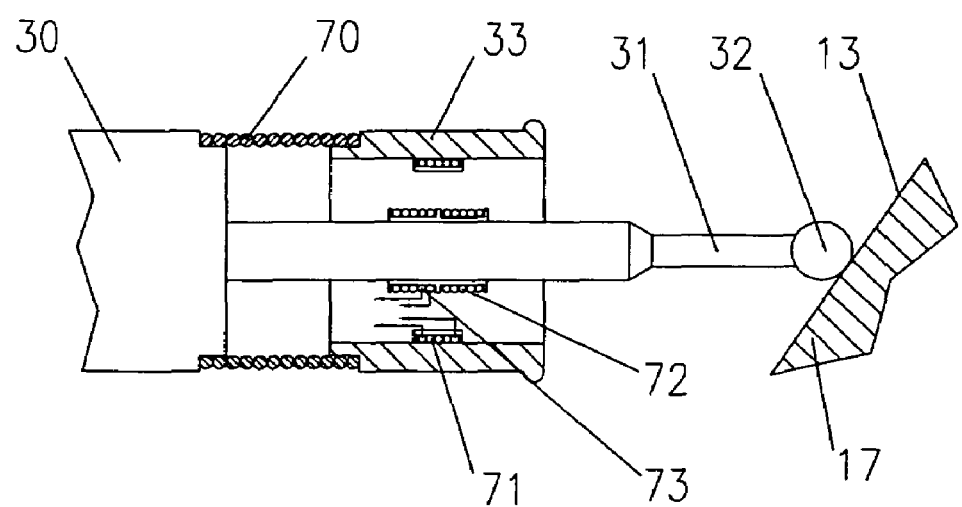
FIG. 9 is a schematic partial longitudinal section of a floating flexible spring probe made in accordance with a second embodiment of the present invention.

FIG. 9 shows a second embodiment in which the handle body is constrained to the base of the stylus 30 by a preloaded traction spring 70. Said spring 70 is inserted between the base of the stylus 30 and the floating handle body 33. Once the operator has gripped the handle body 33, the spring 70 may be deformed laterally or even axially when the ball 32 is in contact with the surface of the part 17. When in the home position, all of the coils of the preloaded traction spring 70 are in contact with one another with a predetermined level of preloading, meaning that they constitute a rigid body defining a home position for the centred handle body 33. Only when the lateral or axial loads exceed predetermined values do the coils of the spring 70 detach from one another, allowing the handle body 33 to float relative to the stylus 31.

In this example the sensors are represented by an LVDT type differential transformer. It basically consists of a coil 71 integral with the handle body 33 and supplied at a sufficiently high frequency, and two coils 72 and 73 integral with the stylus 31, wound in the opposite direction and positioned in series and centred relative to the position of the coil 71. When the handle body 33 is in the home position the voltage induced in the series of the two coils is zero. When the handle body 33 bends or moves the voltage induced on the series of two coils is other than zero and increases with increases in the deformation. An electronic circuit indicates when the signal is within predetermined threshold values, defining the range of deflections within which gauging is enabled.

Figure 10:
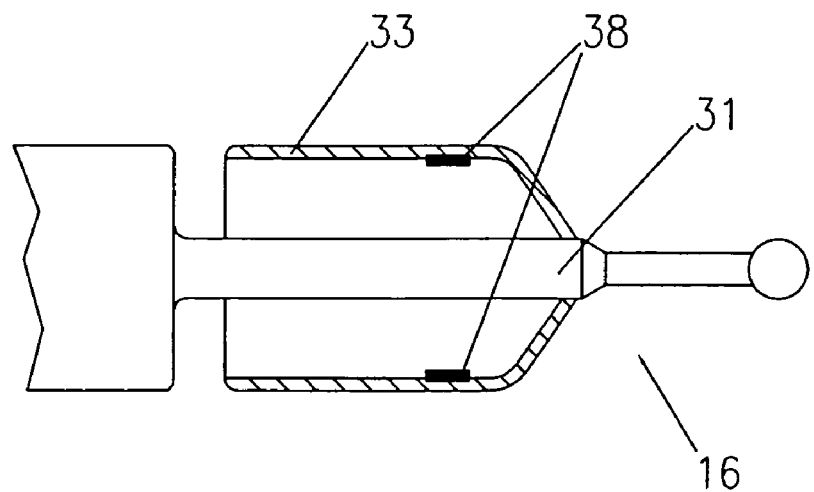
FIG. 10 is a schematic view of a third embodiment with a probe equipped with a handle body with load sensors in which the sensors are applied to the handle body.
Figure 11:
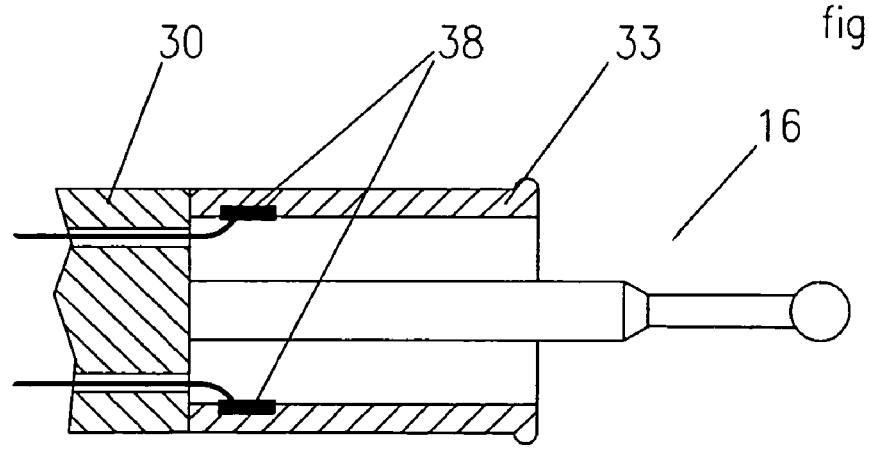
FIG. 11 is a schematic view of a fourth embodiment of the probe with load sensors equipped with a handle body connected differently to the gauging stylus, again with load sensors applied to the handle body.

FIGS. 10 and 11 show two other embodiments in which a handle body 33 is equipped with load sensors 38.

FIG. 10 shows a third embodiment of the invention in which the handle body 33 is fixed to the gauging stylus 31, and the load sensors 38 are present close to the fixing zone so that they are subjected to the loads acting between the handle body and the stylus.

FIG. 11 shows a fourth embodiment of the probe with load sensors in which the handle body 33 is fixed to the base of the stylus 30, whilst the load sensors 38 are fixed to the handle body 38 close to the zone for anchoring to the base of the stylus so that they are subjected to the loads acting between the handle body and the stylus.

The force sensors 38 may be movement sensors which detect the extent of the handle body 33 elastic yielding, such yielding depending on the forces acting between the handle body and the gauging stylus. Said sensors may therefore be used to discover the force, since loads and deformations are linked by a proportional relationship. From the forces measured and the position and angle of the sensors, it is possible to discover, with acceptable errors, the forces acting at the gauging ball with the known relations.

In other embodiments the movement sensors may be of the LVDT type. Automatic enabling of gauging is easily obtainable with the prior art methods using an electronic circuit in which the minimum and maximum force values are preset, within which gauging is enabled. The enabled for gauging status may be indicated acoustically or visually with illuminated signals, such as LEDs, positioned in the handle body.

It should be considered that when gauging is enabled, the series of measurements may be acquired for example on the basis of a preset acquisition frequency or on the basis of a predetermined step, or distance between two due consecutive measurements. In another embodiment of the probe 16, illustrated in FIG. 12, there is a stylus having the shape of a fork, particularly recommended for gauging pipes. At the end of the gauging stylus it has a gauging surface consisting of two cylindrical styli arranged in a V shape and positioned and angled symmetrically to it, which are brought into contact with the pipe during gauging. When the handle body, not indicated in the drawing but which may have any of the forms presented, is operated, and when the load applied is within two predetermined values, gauging is enabled.

Figure 12:
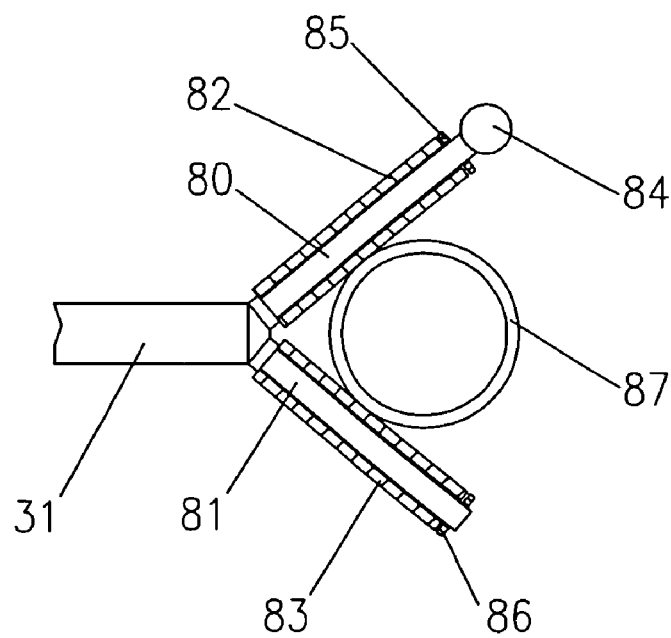
FIG. 12 is a schematic view of a probe particularly recommended for gauging pipes, in which the gauging surface consists of two cylindrical surfaces.

FIG. 12 shows a gauging stylus particularly recommended for gauging pipes, in which fixed to the base of the stylus 31 there are two rods arranged in a "V" shape 80 and 81, around which the tubes 82 and 83 are free to rotate, whose outer surface constitutes the gauging surface which is placed in contact with the surface to be gauged consisting of the outer surface of the pipe 87. The two tubes 82 and 83 are held axially in position by two stop rings 85 and 86.

Fixed at the end of one or both of the rods 80 and 81 there may be a ball 84 constituting a new gauging surface, both for gauging the pipe and for gauging mechanical parts other than the pipe. The handle body may be of the floating type or it may be equipped with load sensors as already described.

Therefore, in general, various forms may be adopted for the gauging surface, even though in the above description and in the accompanying drawings it is mainly indicated and represented with a gauging ball. This is simply because it is the most common form.

The aim of this invention to propose a gauging probe which allows automatic acquisition of a single point or a sequence of points in a continuous fashion is achieved.

The aim of the invention to propose a gauging probe which avoids direct contact between the hand and the gauging stylus so as to avoid heating up the stylus and the consequent gauging errors caused by the thermal deformation induced is achieved.

The aim of this invention to propose a probe for gauging machines with articulated arms, which is positioned and angled directly by the operator's hand and which allows automatic acquisition of a single measurement or a sequence of measurements when the force applied on the probe handle body for the gauging is within a predetermined range of values is achieved.

The aim of an embodiment of the invention to propose a probe which allows automatic acquisition of the measurement while the operator sees, directly in the probe, the condition which enables gauging and is therefore able to control it is achieved.

The further aim, not the last, to avoid applying load sensors directly on the gauging stylus or on the base of the gauging stylus, thus avoiding the elastic deformations required by the sensor influencing gauging precision is achieved.

The handle body may have various forms and it may be made floating or equipped with load sensors combining various types of movement relative to the gauging stylus without changing what characterises the probe.

SOME PREFERRED EMBODIMENTS OF THE INVENTION

One embodiment of the invention is a probe for gauging machines with articulated arms, comprising a fixed gauging stylus (31), supporting, at its end, a gauging surface, characterised in that it also comprises a handle body (33) which can be manually operated by an operator to push the gauging surface against a surface to be gauged (13), and in that the handle body (33) is equipped with load sensors sensitive to the force acting between the gauging surface and the surface to be gauged and in that the signal supplied by the sensors controls measurement acquisition.

Another embodiment of the invention is a probe for gauging machines with articulated arms, comprising a fixed gauging stylus (31), supporting, at its end, a gauging surface, characterised in that it also comprises a handle body (33) which can be manually operated by an operator to push the gauging surface against a surface to be gauged (13), and in that the handle body (33) is equipped with load sensors sensitive to the force acting between the gauging surface and the surface to be gauged and in that when the signal supplied by the sensors is within a predetermined range of values, measurement acquisition is enabled.

Another embodiment of the invention is a probe for gauging machines as described above, characterised in that the handle body (33) is floating and in that the handle body (33) is preloaded by forces which hold it in a predetermined home position relative to the gauging stylus (31), also being characterised in that the handle body (33) moves relative to the home position when the lateral load or the axial load applied manually on the handle body (33) exceed predetermined values.

Another embodiment of the invention is a probe for gauging machines as described above, characterised in that the handle body (33) is floating and in that the handle body (33) consists of a body which can move from the home position when the lateral or axial load exceed a predetermined value.

Another embodiment of the invention is a probe for gauging machines as described above, characterised in that the handle body (33) is floating and in that the handle body (33) consists of two or more bodies which can move from their home position when the lateral or axial load exceed predetermined values.

Another embodiment of the invention is a probe for gauging machines as described above, characterised in that the handle body (33) is floating and in that the handle body (33) is constrained to the base of the stylus (31) by a preloaded traction spring (70).

Another embodiment of the invention is a probe for gauging machines as described above, characterised in that the handle body (33) is floating and in that it comprises one or more elastic elements (34) which act symmetrically between the handle body (33) and the gauging stylus (31), applying a resultant force parallel with the axis of the gauging stylus (31).

Another embodiment of the invention is a probe for gauging machines as described above, characterised in that the handle body (33) is floating and in that the handle body (33) is constrained by an elastic body (70) to the base of the stylus, and in that it deforms when the lateral or axial load exceed predetermined values.

Another embodiment of the invention is a probe for gauging machines as described above, characterised in that the handle body (33) is floating and in that it comprises one or more sensors which supply a gauging enabled signal when the axial or lateral movement of the handle body (33) relative to its home position is within predetermined values.

Another embodiment of the invention is a probe for gauging machines as described above, characterised in that the handle body (33) is floating and in that a sensor for detecting handle body (33) minimum deflection relative to the gauging stylus (31) is obtained from a ring (50) equipped with projecting contacts (51) which when they are all in contact with the handle body (33) supply the home condition signal.

Another embodiment of the invention is a probe for gauging machines as described above, characterised in that the handle body (33) is floating and in that a sensor for detecting handle body (33) maximum deflection relative to the gauging stylus (31) is obtained with a metal ring (52) which makes contact with the handle body (33) and when the movement from the home position exceeds a predetermined value.

Another embodiment of the invention is a probe for gauging machines as described above, characterised in that the handle body (33) is floating and in that the sensor for detecting handle body (33) deflection relative to the gauging stylus (31) is made using an LVDT type differential transformer (71, 72, 73) which detects the extent of the lateral and axial deflection.

Another embodiment of the invention is a probe for gauging machines as described above, characterised in that the handle body (33) is floating and in that during gauging the operator has a direct view in the probe of the extent of the handle body (33) movement from its home position.

Another embodiment of the invention is a probe for gauging machines as described above, characterised in that when the signal supplied by the sensors is within a predetermined range of values, measurement acquisition is enabled.

Another embodiment of the invention is a probe for gauging machines as described above, characterised in that the handle body (33) is equipped with load sensors which supply a signal which depends on the force acting between the handle body (33) and the gauging stylus (31) and in that gauging is enabled when the signal is within predetermined values.

Another embodiment of the invention is a probe for gauging machines as described above, characterised in that the handle body (33) is fixed to the base of the gauging stylus (31).

Another embodiment of the invention is a probe for gauging machines as described above, characterised in that the handle body (33) is fixed to the gauging stylus (31).

Another embodiment of the invention is a probe for gauging machines as described above, characterised in that when the force detected by the load sensors (38) is within a predetermined range of values, the gauging surface position measurement is acquired without pressing any push-buttons.

Another embodiment of the invention is a probe for gauging machines as described above, characterised in that when the force detected is within a predetermined range of values, a set of gauging surface position measurements is acquired automatically without pressing any push-buttons.

Another embodiment of the invention is a probe for gauging machines as described above, characterised in that the load sensors (38) are movement sensors which detect the extent of the handle body (33) elastic yielding, such yielding depending on the forces acting on the gauging surface.

Another embodiment of the invention is a probe for gauging machines as described above, characterised in that the probe is equipped with one or more LVDT type movement sensors.

Another embodiment of the invention is a probe for gauging machines as described above, characterised in that the gauging surface consists of a gauging ball (32).

Another embodiment of the invention is a probe for gauging machines as described above, characterised in that the gauging surface consists of two cylindrical surfaces arranged in a V shape and fixed to the gauging stylus (31).

Another embodiment of the invention is a probe for gauging machines as described above, characterised in that the two cylindrical gauging surfaces consist of two small tubes free to rotate about their axis.

Another embodiment of the invention is a probe for gauging machines as described above, characterised in that at the end of at least one of the two cylindrical surfaces arranged in a V shape there is a spherical gauging surface.

Several preferred embodiments of the present invention were illustrated and described, but it shall be understood that alternative embodiments may be possible, without departing from the scope of protection of the present industrial invention patent.

The invention claimed is:

1. A probe for gauging machines with articulated arms, comprising a fixed gauging stylus (31), supporting, at its end, a gauging surface, characterised in that it also comprises a handle body (33) which can be manually operated by an operator to push the gauging surface against a surface to be gauged (13), and in that the handle body (33) is equipped with load sensors sensitive to the force acting between the gauging surface and the surface to be gauged and in that the signal supplied by the sensors controls measurement acquisition.

2. The probe for gauging machines according to claim 1, characterised in that the handle body (33) is floating and in that the handle body (33) is preloaded by forces which hold it in a predetermined home position relative to the gauging stylus (31), also being characterised in that the handle body (33) moves relative to the home position when the lateral load or the axial load applied manually on the handle body (33) exceed predetermined values.

3. The probe for gauging machines according to claim 1, characterised in that the handle body (33) is floating and in that the handle body (33) consists of a body which can move from the home position when the lateral or axial load exceed a predetermined value.

4. The probe for gauging machines according to claim 1, characterised in that the handle body (33) is floating and in that the handle body (33) consists of two or more bodies which can move from their home position when the lateral or axial load exceed predetermined values.

5. The probe for gauging machines according to claim 1, characterised in that the handle body (33) is floating and in that the handle body (33) is constrained to the base of the stylus (31) by a preloaded traction spring (70).

6. The probe for gauging machines according to claim 1, characterised in that the handle body (33) is floating and in that it comprises one or more elastic elements (34) which act symmetrically between the handle body (33) and the gauging stylus (31), applying a resultant force parallel with the axis of the gauging stylus (31).

7. The probe for gauging machines according to claim 1, characterised in that the handle body (33) is floating and in that the handle body (33) is constrained by an elastic body (70) to the base of the stylus, and in that it deforms when the lateral or axial load exceed predetermined values.

8. The probe for gauging machines according to claim 1, characterised in that the handle body (33) is floating and in that it comprises one or more sensors which supply a gauging enabled signal when the axial or lateral movement of the handle body (33) relative to its home position is within predetermined values.

9. The probe for gauging machines according to claim 8, characterised in that the handle body (33) is floating and in that a sensor for detecting handle body (33) minimum deflection relative to the gauging stylus (31) is obtained from a ring (50) equipped with projecting contacts (51) which when they are all in contact with the handle body (33) supply the home condition signal.

10. The probe for gauging machines according to claim 8, characterised in that the handle body (33) is floating and in that a sensor for detecting handle body (33) maximum deflection relative to the gauging stylus (31) is obtained with a metal ring (52) which makes contact with the handle body (33) and when the movement from the home position exceeds a predetermined value.

11. The probe for gauging machines according to claim 8, characterised in that the handle body (33) is floating and in that the sensor for detecting handle body (33) deflection relative to the gauging stylus (31) is made using an LVDT type differential transformer (71, 72, 73) which detects the extent of the lateral and axial deflection.

12. The probe for gauging machines according to claim 1, characterised in that the handle body (33) is floating and in that during gauging the operator has a direct view in the probe of the extent of the handle body (33) movement from its home position.

13. The probe for gauging machines according to claim 1, characterised in that when the signal supplied by the sensors is within a predetermined range of values, measurement acquisition is enabled.

14. The probe for gauging machines according to claim 1, characterised in that the handle body (33) is equipped with load sensors which supply a signal which depends on the force acting between the handle body (33) and the gauging stylus (31) and in that gauging is enabled when the signal is within predetermined values.

15. The probe for gauging machines according to claim 14, characterised in that the handle body (33) is fixed to the base of the gauging stylus (31).

16. The probe for gauging machines according to claim 14, characterised in that the handle body (33) is fixed to the gauging stylus (31).

17. The probe for gauging machines according to claim 14, characterised in that when the force detected by the load sensors (38) is within a predetermined range of values, the gauging surface position measurement is acquired without pressing any push-buttons.

18. The probe for gauging machines according to claim 1, characterised in that when the force detected is within a predetermined range of values, a set of gauging surface position measurements is acquired automatically without pressing any push-buttons.

19. The probe for gauging machines according to claim 1, characterised in that the load sensors (38) are movement sensors which detect the extent of the handle body (33) elastic yielding, such yielding depending on the forces acting on the gauging surface.

20. The probe for gauging machines according to claim 14, characterised in that the probe is equipped with one or more LVDT type movement sensors.

21. The probe for gauging machines according to claim 1, characterised in that the gauging surface consists of a gauging ball (32).

22. The probe for gauging machines according to claim 1, characterised in that the gauging surface consists of two cylindrical surfaces arranged in a V shape and fixed to the gauging stylus (31).

23. The probe for gauging machines according to claim 22, characterised in that the two cylindrical gauging surfaces consist of two small tubes free to rotate about their axis.

24. The probe for gauging machines according to claim 22, characterised in that at the end of at least one of the two cylindrical surfaces arranged in a V shape there is a spherical gauging surface.

25. A probe for gauging machines with articulated arms, comprising a fixed gauging stylus (31), supporting, at its end, a gauging surface, characterised in that it also comprises a handle body (33) which can be manually operated by an operator to push the gauging surface against a surface to be gauged (13), and in that the handle body (33) is equipped with load sensors sensitive to the force acting between the gauging surface and the surface to be gauged and in that when the signal supplied by the sensors is within a predetermined range of values, measurement acquisition is enabled.

* * * * *